(12) United States Patent
Karlsson

(10) Patent No.: US 6,423,937 B1
(45) Date of Patent: Jul. 23, 2002

(54) ARC IGNITION ARRANGEMENT

(75) Inventor: Rolf Karlsson, Laxå (SE)

(73) Assignee: Esab AB, Gothenburg (SE)

( * ) Notice: Subject to any disclaimer, the term of this patent is extended or adjusted under 35 U.S.C. 154(b) by 0 days.

(21) Appl. No.: 09/508,298

(22) PCT Filed: Sep. 10, 1998

(86) PCT No.: PCT/SE98/01615
§ 371 (c)(1),
(2), (4) Date: Mar. 9, 2000

(87) PCT Pub. No.: WO99/12690
PCT Pub. Date: Mar. 18, 1999

(30) Foreign Application Priority Data

Sep. 10, 1997 (SE) ................................................ 9703283

(51) Int. Cl.[7] .............................................. B23K 9/067
(52) U.S. Cl. ..................................... 219/130.4; 219/132
(58) Field of Search .................... 219/130.4, 137 R, 219/137 PS, 130.5, 132

(56) References Cited

U.S. PATENT DOCUMENTS 2,957,977 A * 10/1960 Sullivan ................. 219/317 R
4,628,180 A * 12/1986 Edberg .................... 219/130.4

FOREIGN PATENT DOCUMENTS

DE 2459309 * 6/1976 .............. 219/130.4

* cited by examiner

Primary Examiner—Clifford C. Shaw
(74) Attorney, Agent, or Firm—Nils H. Ljungman & Associates

(57) ABSTRACT

The invention relates to an arrangement for contact arc ignition in manual TIG welding and to a method for welding with this arrangement. The arc is established by lifting the welding torch (12) after contact between electrode (13) and workpiece (14) under low ignition current. When the arc length is sufficient, the welder orders a change-over to welding current via an operating device (11). The invention can also be used for controlling the supply of heat to the workpiece both during continuous bead application and during the crater filling time at the end of welding. The invention creates reliable ignitions without extensive use of control electronics, and it substantially reduces the electrode wear in manual TIG welding.

16 Claims, 2 Drawing Sheets

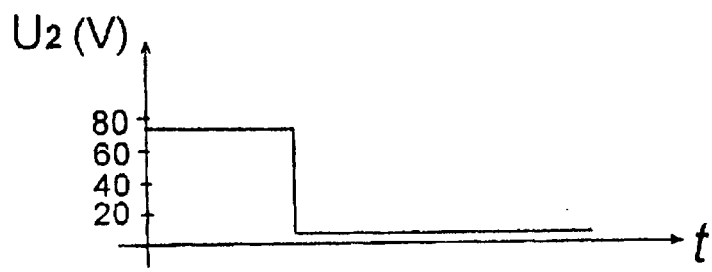
Fig. 2a
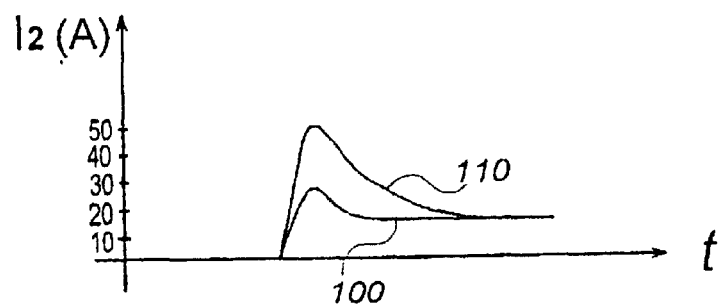
Fig. 2b
Fig. 2
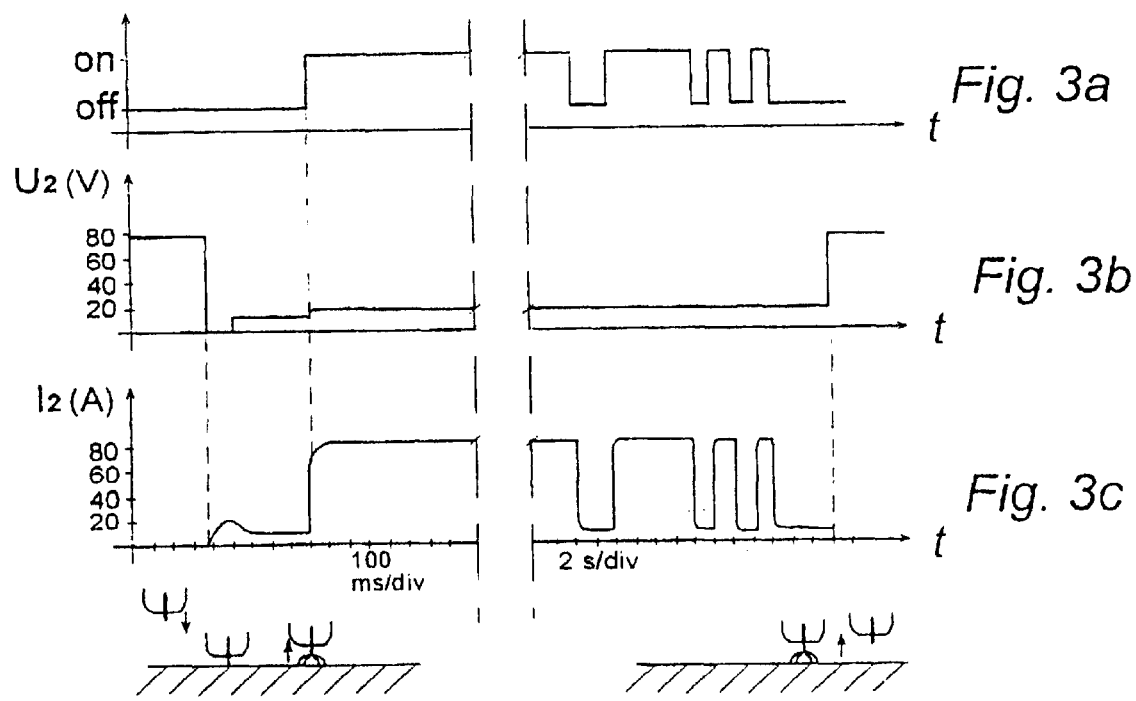
Fig. 3a
Fig. 3b
Fig. 3c
Fig. 3

ARC IGNITION ARRANGEMENT

TECHNICAL FIELD

The present invention relates to an arrangement for contact arc ignition in manual TIG welding.

BACKGROUND

In TIG welding today, there are principally three different methods for establishing the arc.

Contactless ignition by means of the protective gas being ionized by high-frequency high voltage. This method is called HP ignition and is regularly used in high-quality welding, where it is important that no inclusions of the electrode material are present in the weld deposit. The method provides good starts, but it also has disadvantages such as a high cost and often very disruptive radiation. This means that the method cannot be used in electrically sensitive environments.

Contact ignition according to the LIFTARC® ignition method in which the electrode is brought into contact with the workpiece. Thereafter the welding gun trigger is pressed and the current source delivers a low current until the gun is lifted and an arc voltage can thereby be detected. The current is then raised automatically to the value set for the welding. The aim of the low starting current is to reduce inclusions of the electrode material in the weld deposit. The method gives good results where welding is done under stable conditions, i.e. with a well clamped workpiece and constant positioning of the welder. If these two requirements are not both satisfied, it is easy to inadvertently cause dipping of the welding electrode immediately after the arc has ignited. Since the current has then been raised and a molten pool is under formation, the electrode will adhere or stick firmly in the small melt, which rapidly solidifies when the arc goes out. This leads to undesired inclusions of electrode material in the weld deposit and also to operational stoppages, since the electrode has to be reground. The quality in TIG welding is to a large extent dependent on the electrode being well ground with the correct angle at the tip. Otherwise, the arc stability is negatively affected, as is the penetration in the seam. The LIFTARC® ignition method also requires a great deal of electronics in the welding machine since the arc voltage has to be measured. This is particularly so if the control part of the current source lies on the primary side in an inverter current source. In that case, a galvanic isolation of the analogue arc voltage must take place before it can be used in the control part. Alternatively, dual electronics systems with dual voltage supplies, etc., can be constructed. This makes such current sources more expensive.

Finally, there is the third and simplest ignition method—scrape ignition. The method involves the welder very briefly stroking or dipping the electrode against the workpiece while the current source is set at full welding current. The method demands great skill, and in all circumstances involves a considerable amount of wear of the electrode, with frequent regrinding as a consequence. Obviously this is the method which gives the greatest inclusions of electrode material in the weld deposit. The advantage of the method is that it does not necessitate any extra equipment in the machine. Only a TIG torch with gas valve is needed in order to use a conventional MMA machine, primarily intended for welding with coated electrodes, as a TIG power source. A problem in this connection is the start surge which an MMA machine is provided with. At each start, the current is increased in relation to the set current value for 200–700 milliseconds. This is an important function in order to quickly form a molten pool so that the coated electrode does not stick firmly. At least at higher currents, the amplitude of the start surge is directly dependent on the set current. In the case of TIG welding with scrape starting, this can easily lead to overloading of the electrode. In addition, a molten pool is very quickly formed which, in the case of dipping of the electrode on account of shaking at the start of welding, often leads to the electrode sticking, which entails regrinding and lost productivity. Another problem with the method arises when the arc is to be interrupted. This is done by the welding torch being removed from the workpiece to a sufficient extent to ensure that the arc will go out. In welding at a high current, this is a problem, since the arc can in these cases be a good 50 mm before it is interrupted.

OBJECT OF THE INVENTION

The object of the invention is to provide an arrangement for contact ignition of a TIG arc, which affords a solution to the above problems without having the inherent disadvantages of the prior art.

According to the invention, this object is achieved by using a switch on the welding gun to shift manually between a low ignition current and a set welding current. Thus the electrodes is held in contact with the workpiece with such a low current that the electrode is not damaged. This contact time is not in any way critical. Thereafter the torch is lifted and an arc is established with the low ignition current. The arc is stable with respect to great variations in the arc length. 10 mm does not cause any problems. As long as the current is low, the basic material is not melted appreciably if the material thickness is greater than 0.7 mm, and the torch can therefore be moved on the workpiece without leaving any troublesome traces. It is only when the electrode is situated in the correct starting position, and when the welder sees fit, that he presses the welding gun trigger. The current then rises to the set welding current. The method eliminates the critical moment when the arc has just been ignited and the molten pool is beginning to take form, while the electrode is still situated in immediate proximity to the workpiece.

The invention also affords considerable advantages as the welding proceeds. By releasing the gun trigger and thereby going down to the low ignition current, the welder can compensate for excessively high heat, for example due to varying gap conditions, without having to interrupt the arc and reignite it. This can also be made use of between different seams, as well as at the end of a seam, in order to successively reduce the supply of heat and thereby reduce the size of the molten pool in order to reduce the risk of an end crater upon completion of welding. With a conventional MMA current source, an extra remote device is needed for this control. In TIG welding with filler metal, the welder has both hands occupied and does not therefore have the possibility of manually handling a additional remote device. In this connection, the invention clearly affords better handling.

Electrode wear is dramatically reduced, on the one hand as a result of more reliable starting, with greatly reduced risk of electrode dipping, and on the other hand as a result of the possibility of avoiding the need to interrupt the arc during welding, both in one and the same weld bead and also between different beads on the same workpiece.

A further advantage is that it is possible to improve the penetration by means of welding at a higher welding current than is recommended for continuous welding, since it is easy to reduce the heat supply by releasing the trigger.

At the end of welding, the arc is of course interrupted from the low current level, which eliminates the very long arcs associated with scrape starts.

The arrangement does not need any extensive electronics—no complicated galvanic isolation of analogue signals, when the control electronics lie on the primary side in inverter machines. This provides cost advantages compared with the LIFTARC® method.

Compared with HF starts, the invention has, in addition to cost advantages, the further advantage of not emitting disruptive radiation, which means that it can be used in environments where HF-started machines are not approved.

BRIEF DESCRIPTION OF THE DRAWING

FIGS. 2a and 2b show voltage and current during the start procedure, with two different start surges indicated.

FIGS. 3a, 3b, and 3c show a typical welding cycle with ignition, start surge, continuation, and pulsing for cooler melt.

DESCRIPTION OF PREFERRED EMBODIMENTS

Figure 1:
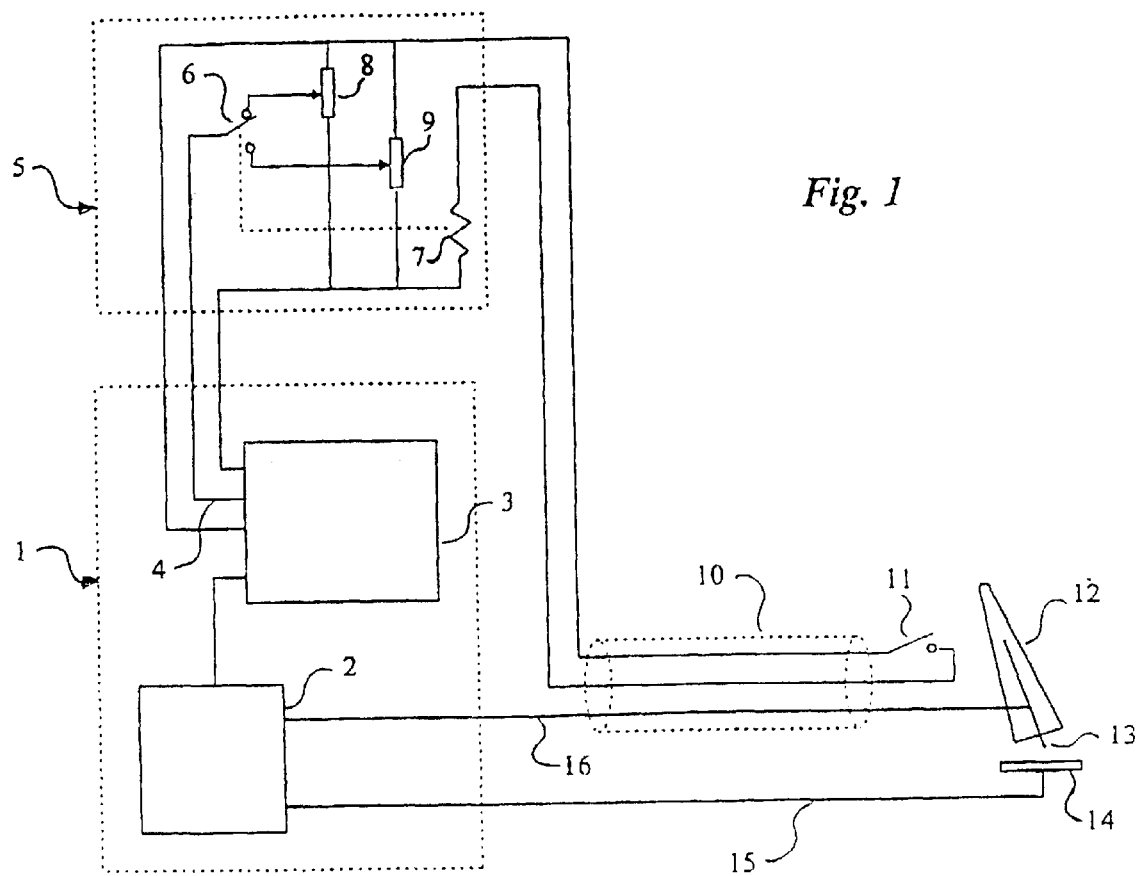
FIG. 1 is a diagrammatic representation of an embodiment of the invention.

Examples of embodiments of the invention will now be discussed with reference to the drawings.

Current source 1 consisting of control part 3 and power part 2 delivers current to the welding torch 12 with its electrode 13 via the welding cable 16. The arc burns between the electrode and the workpiece 14, from which the return cable 15 leads the current back to the power part of the current source. The current set value converter 5 comprises at least two current set value adjusters 8, 9 and a selector member 6 which is controlled from the gun trigger 11 which is preferably placed on or in immediate proximity to the welding torch 12. Welding hose 10 and an input for current set value 4 are other units shown in FIG. 1.

FIG. 2 shows the voltage $U_2$ between the welding cable and the return cable 15 and the current $I_2$ in these cables as a function of the time during a start-up procedure. The curve 110 in FIG. 2b indicates a powerful starting current surge, as often occurs in MMA machines. The curve 100 indicates a more advantageous start surge for TIG arc ignition.

The control part 3 is equipped to control the power part with a current surge of 120–250% of the set current value, preferably 130–180%.

In FIG. 3, voltage and current are illustrated as per FIG. 2, the left-hand side showing a starting procedure, and the right-hand side showing how it can appear during continuous welding and at the end of welding, when use is made of the possibilities, afforded by the invention, of controlling the supply of heat by pulsing using the gun trigger. FIG. 3a shows the on-off status of the gun trigger. FIG. 3b shows the voltage between welding cable and return cable over time. The position of the welding torch in relation to the workpiece at the different time stages is indicated at the very bottom of FIG. 3. FIG. 3c shows the current in the welding cable. The time axis is in 100 ms scale divisions on the left side of the figure and in 2 s scale divisions on the right side.

A possible variant is for the welding torch 12, the operating device 11, the welding hose 10 and the current set value converter 5 to be delivered as an accessory kit for converting a pure MMA machine to a TIG machine after connection to a remote socket. A gas valve (not shown here) should also be included in the torch. The requirements in respect of the MMA current source for successful conversion are that it can be controlled from as low a current as 10–30A and that it gives a starting current surge within the ranges which have previously been indicated here.

The contact-making gun trigger and switching relay contact in FIG. 1 are of course only design examples. It is also possible for a number of buttons to be provided on or close to the welding torch.

A suitable starting current level is 8–40 A, preferably 10–30 A.

What is claimed is:

1. A manual TIG welding apparatus, comprising;
a welding torch;
a source of inert welding gas to provide inert gas to said welding torch and a work piece;
an operating device to provide electric current to operate said welding torch;
current set value circuitry to set welding current in said welding torch;
a control arrangement to control said operating device;
said control arrangement comprising circuitry to change current in said welding torch between at least a first and a second level of current in which the first level of current corresponds to a minimum current to reliably establish an arc between said welding torch and a workpiece, and the second level of current corresponds to a welding current to weld a workpiece;
an operator actuatable control to provide a signal to set current provided by said operating device to said welding torch to the first current level and the second current level.

2. The manual TIG welding apparatus according to claim 1 wherein such operator control is a push bottom.

3. The manual TIG welding apparatus according to claim 2 wherein said push bottom is placed on or in immediate proximity to the welding torch.

4. The manual TIG welding apparatus according to claim 1 wherein such control arrangement comprises means for providing a period of time of less than 1 second, and means for generating a starting current surge of the ignition current through the arc of 120–250% of the ignition current.

5. The manual TIG welding apparatus according to claim 4 wherein such control arrangement comprises means for providing a period of time of less than 1 second, comprising means for providing a period between 200–700 milliseconds, and such means for generating a starting current surge of the ignition current through the arc of 120–250%, comprising means for generating a starting current surge of the ignition current through the arc of 130–180%.

6. The TIG welding apparatus according to claim 5, further comprising means for selecting the lower current set value level to correspond to a current through the arc of between 8 and 40 amperes.

7. The TIG welding apparatus according to claim 6, further comprising means for selecting the lower current set value level to correspond to a current through the arc of between 10–30 amperes.

8. The manual TIG welding apparatus according to claim 7 wherein said push button is placed on the welding torch.

9. A method of operating a manual TIG welding apparatus for arc ignition in manual TIG welding, said apparatus comprising:
a manual TIG welding apparatus comprising:
a welding torch and a work piece;
a source of inert welding gas to provide inert gas to said welding torch;
an operating device to provide electric current to operate said welding torch;
current set value circuitry to set welding current in said welding torch;

a control arrangement to control said operating device;
said control arrangement comprising circuitry to change current in said welding torch between at least a first and a second level of current in which the first level of current corresponds to a minimum current to reliably establish an arc between said welding torch and a workpiece, and the second level of current corresponds to a welding current to weld a workpiece;
an operator actuatable control to provide a signal to set current provided by said operating device to said welding torch to the first current level and the second current level;
said torch comprising an electrode;
said method comprising:
   manually setting said operator control to the first current;
   manually contacting the workpiece with said electrode with said operator actuatable control being manually set to a position of the first current level for ignition current;
   manually lifting the torch so that a reliable arc is established between electrode and workpiece,
   manually adjusting the established arc to a suitable arc length;
   manually setting the operator actuatable control to the second current to change the current to the welding current; and
   welding a workpiece.

10. The method according to claim 9, for ending a weld bead in manual TIG including operating in a crater-filling mode;
by pulsing the current through the arc between welding current and ignition current;
by repeated actuating said operating device, with a successively decreasing ratio between the time for welding current and the time for ignition current, and in that the arc is finally extinguished by removing the torch from the workpiece in the ignition current position.

11. Method according to claim 9, including adapting the supply of heat to varying conditions on the workpiece in manual TIG welding;
by pulsing the current through the arc between welding current and ignition current by repeated actuation of such operator actuatable control;
by adjusting the ratio between the time for welding current and the time for ignition current, so that the effect of variations in at least one of gap and thickness, and of variations in the distance to the plate edge, on the welding quality is substantially reduced.

12. Method according to claim 9, including moving the welding torch from weld seam to weld seam on the same workpiece in manual TIG welding in which said moving is effected with arc burning on ignition current, and, by actuation of the operating device, welding current is coupled in at the start of the new seam.

13. Method according to claim 9, where said operator actuatable control comprises a push button, and in that the actuating of the operating devices comprises pressing or releasing or, alternatively, pressing and releasing said button.

14. A manual TIG welding apparatus, comprising:
a welding torch;
a source of inert welding gas to provide inert gas to said welding torch and a work piece;
a current source to provide electric current to operate said welding torch;
current set value circuitry to set welding current in said welding torch;
manually-operated control arrangement to control said current source;
said manually-operated control arrangement comprising a manually-operated, operator-actuatable control being configured to manually provide a signal to change current in said welding torch between at least a first and a second level of current, in which the first level of current corresponds to a minimum current to reliably establish an arc between said welding torch and a workpiece, and the second level of current corresponds to a welding current to weld a workpiece.

15. A manual TIG welding apparatus, comprising:
a welding torch;
means for providing an inert gas to said welding torch and a work piece;
a manually-operated control arrangement to control a welding current from a welding-torch-connectable welding current source;
said manually-operated control arrangement comprising a manually-operated, operator-actuatable control; and
said manually-operated, operator-actuatable control being configured to provide, to said welding current source, a current-change signal to cause a current change between at least a first and a second level of current, in which the first level of current corresponds to a minimum current to reliably establish an arc between said welding torch and a workpiece, and the second level of current corresponds to a welding current to weld a workpiece.

16. A method of operating a manual TIG welding apparatus for arc ignition in manual TIG welding, said manual TIG welding apparatus comprising: a welding torch; means for providing an inert gas to said welding torch and a work piece; a manually-operated control arrangement to control a welding current from a welding-torch-connectable welding current source; said manually-operated control arrangement comprising a manually-operated, operator-actuatable control; and said manually-operated, operator-actuatable control being configured to provide, to said welding current source, a current-change signal to cause a current change between at least a first and a second level of current, in which the first level of current corresponds to a minimum current to reliably establish an arc between said welding torch and a workpiece, and the second level of current corresponds to a welding current to weld a workpiece; said method comprising the steps of:
   manually setting said manually-operated, operator-actuatable control to the first level of current corresponding to a minimum current to reliably establish an arc;
   manually contacting the workpiece with an electrode with said manually-operated, operator-actuatable control being set to a position of the first current level for ignition current;
   manually lifting the torch so that a reliable arc is established between electrode and workpiece;
   manually setting the manually-operated, operator-actuatable control to the second current to change the current to the welding current; and
   welding a workpiece.

* * * * *